United States Patent [19]
Schmidt

[11] Patent Number: 5,419,379
[45] Date of Patent: May 30, 1995

[54] TWO FLAIL DEBARKING CHAIN

[75] Inventor: Phillip A. Schmidt, Tacoma, Wash.

[73] Assignee: Cooper Industries, Inc., Houston, Tex.

[21] Appl. No.: 246,045

[22] Filed: May 18, 1994

Related U.S. Application Data

[63] Continuation-in-part of Ser. No. 72,380, Sep. 6, 1994, Pat. No. 5,343,912.

[51] Int. Cl.⁶ .............................................. B27L 1/00
[52] U.S. Cl. ............................ 144/208 J; 59/85; 59/78; 144/27; 144/208 R; 144/341; 144/343
[58] Field of Search .................... 59/84, 85, 86, 78; 144/208 R, 208 J, 341, 343, 27

[56] References Cited

U.S. PATENT DOCUMENTS 5,243,912  9/1994  Chronister et al. ................ 144/341

Primary Examiner—W. Donald Bray
Attorney, Agent, or Firm—Nelson A. Blish; Eddie E. Scott

[57] ABSTRACT

A debarking chain including a closed chain link attached to an open link by a series of translational and rotational movements. A second chain added in a similar fashion with the first chain locking the second chain in place.

35 Claims, 18 Drawing Sheets

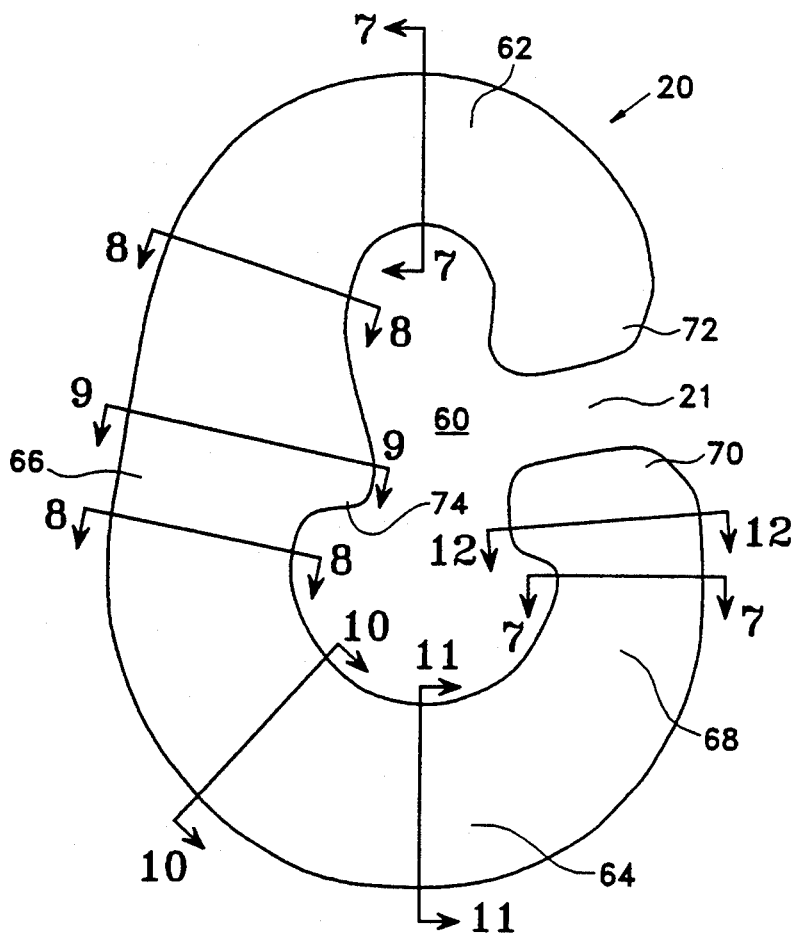
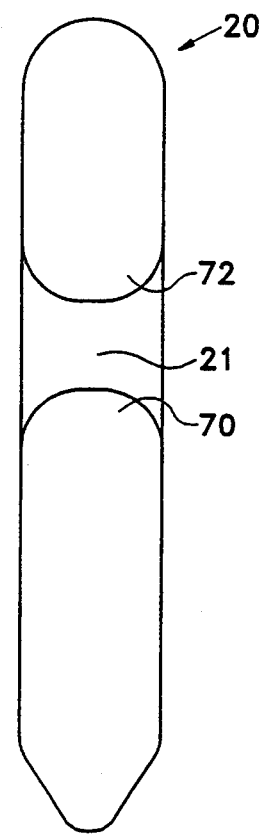
Fig. 5         Fig. 6
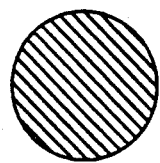   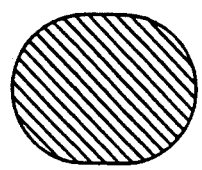   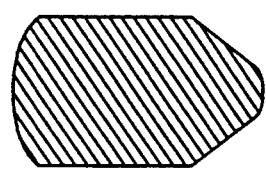
Fig. 7         Fig. 8         Fig. 9
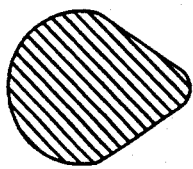   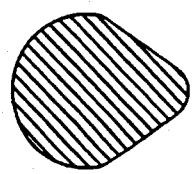   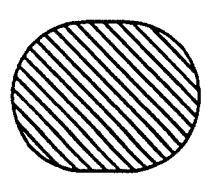
Fig. 10        Fig. 11        Fig. 12

5,419,379

TWO FLAIL DEBARKING CHAIN

BACKGROUND OF THE INVENTION

This application is a continuation in part of Ser. No. 08/072,380, filed Sep. 6, 1994, now U.S. Pat. No. 5,343,912.

This invention pertains to chains in general and in particular to chains used for removing the bark from logs by flailing or beating.

Chains attached to rotating drums or cylinders have proven to be an efficient means for removing bark from trees. These chains wear out quickly because of high stress from repeatedly striking wood and other links of the chain. The chains must be replaced frequently.

The present method of attaching the chains to the drum is to slip one link of the chain into a slot or hole in the drum and slide a rod through an opening in the drum parallel to the drum axis and through the chain link. A problem with this is that a number of chains are attached to each drum and not all of the chains may need to be replaced at the same time. Also the attachment rod itself may become deformed during use and there may be difficulty inserting the rod through the drum for reattachment of the new chain.

Changing and rearranging flail chains is labor intensive and usually requires a two man crew. A man in the flail chamber positions new and rearranged chains in the rotor holes. A second man, on the outside of the flail debarker, reinserts the attachment rods through a small opening in the drum. Communication between the two men is necessary to avoid finger injuries. A two man crew can change and rearrange chains in about 30-45 minutes.

A major drawback to this chain servicing system is that not all the chains will normally need to be changed or rearranged. Flail chains also wear at different rates depending on their position on a rotor. Usually the chains attached to the center half of the drum will wear twice as fast as the chains attached near the end. The standard chain servicing system requires the attachment rods to be pulled completely out of the rotor to service the chains at the end of the rotor. Therefore, all the chains in a row have to be handled and reinserted in the rotor holes, even through some may be in good condition.

An additional problem with the debarking apparatus presently in use is that chains must be discarded before they are worn out. A new 9 link chain may be used until it has lost an end link. The service crew may then flip it to wear the other end until it has lost two more links. The chain is then discarded because it is too short to effectively debark logs; however, it still has 5-6 good links.

SUMMARY OF THE PRESENT INVENTION

In the present invention, the chain is attached to a hook fixed to the rotating drum. A link of the chain is attached to the hook through a series of lineal, rotational, and translational movements so that the link is less likely to disengage by random movement of the chain during the debarking operation. This allows individual chains to be removed without removal of the attachment rod and all the chains on the cylinder. A second chain is attached to the hook through a similar series of translational and rotational movements and is locked into place by the first chain.

BRIEF DESCRIPTION OF THE DRAWINGS

FIG. 5 shows a side view of an open link for a debarking chain according to the present invention.

FIG. 6 is a front view of the open link shown in FIG. 5.

FIGS. 7-12 are sectional views of the link shown in FIG. 5.

DETAILED DESCRIPTION OF THE INVENTION

Figure 1:
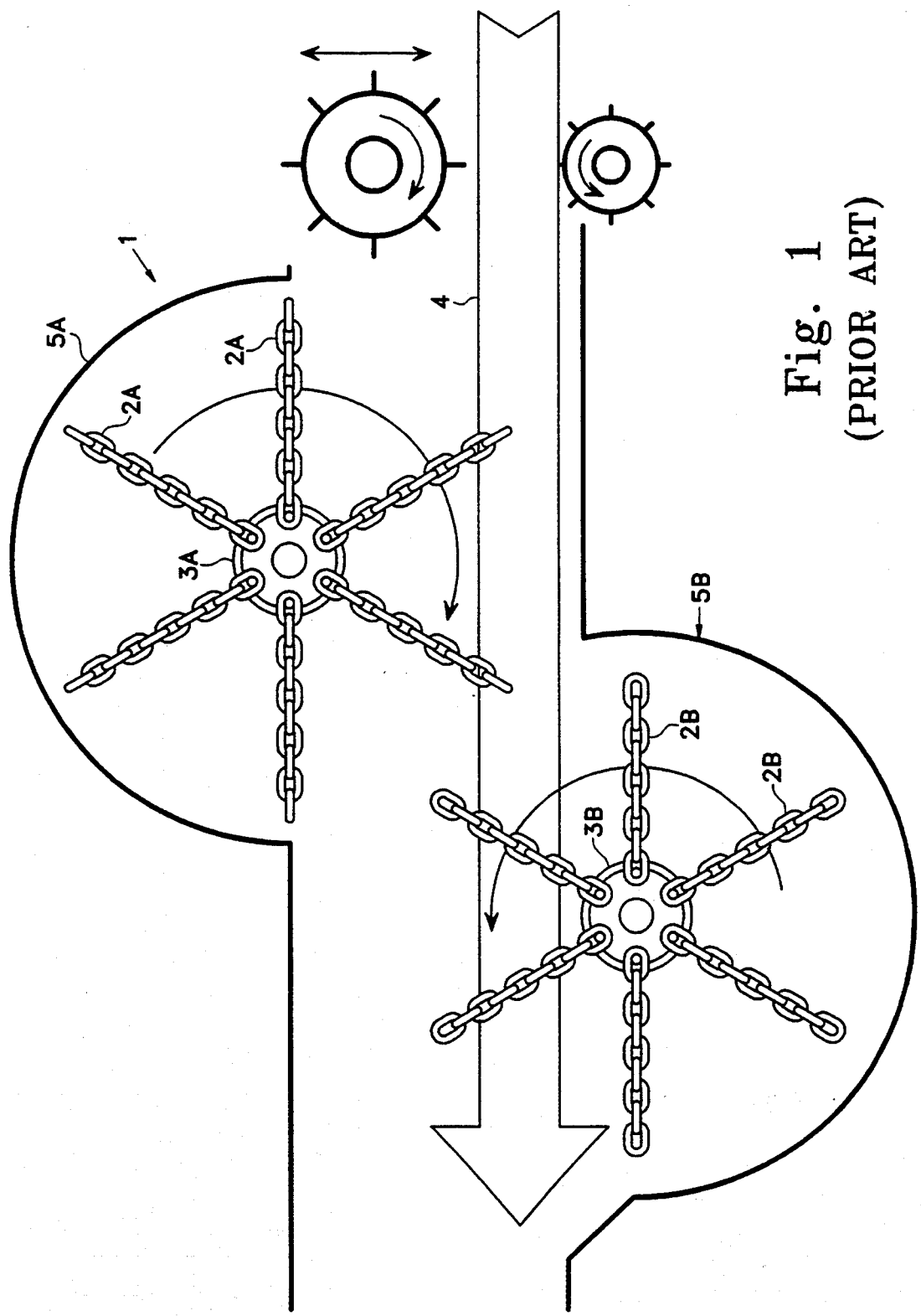
FIG. 1 shows a side view of debarking chains attached to rotating debarker drums.

The modern chain flail debarker is shown in FIG. 1. It is designated in general by numeral 1 and includes a clockwise rotating drum or rotor 3A and a counter-clockwise rotating drum or rotor 3B. Drums 3 use chains 2 attached to counter-rotating drums 3 to beat the bark off of logs 4 being passed lengthwise between drums 3. Flail housings 5A and 5B provide protection from broken pieces of chain and bark.

Figure 2:
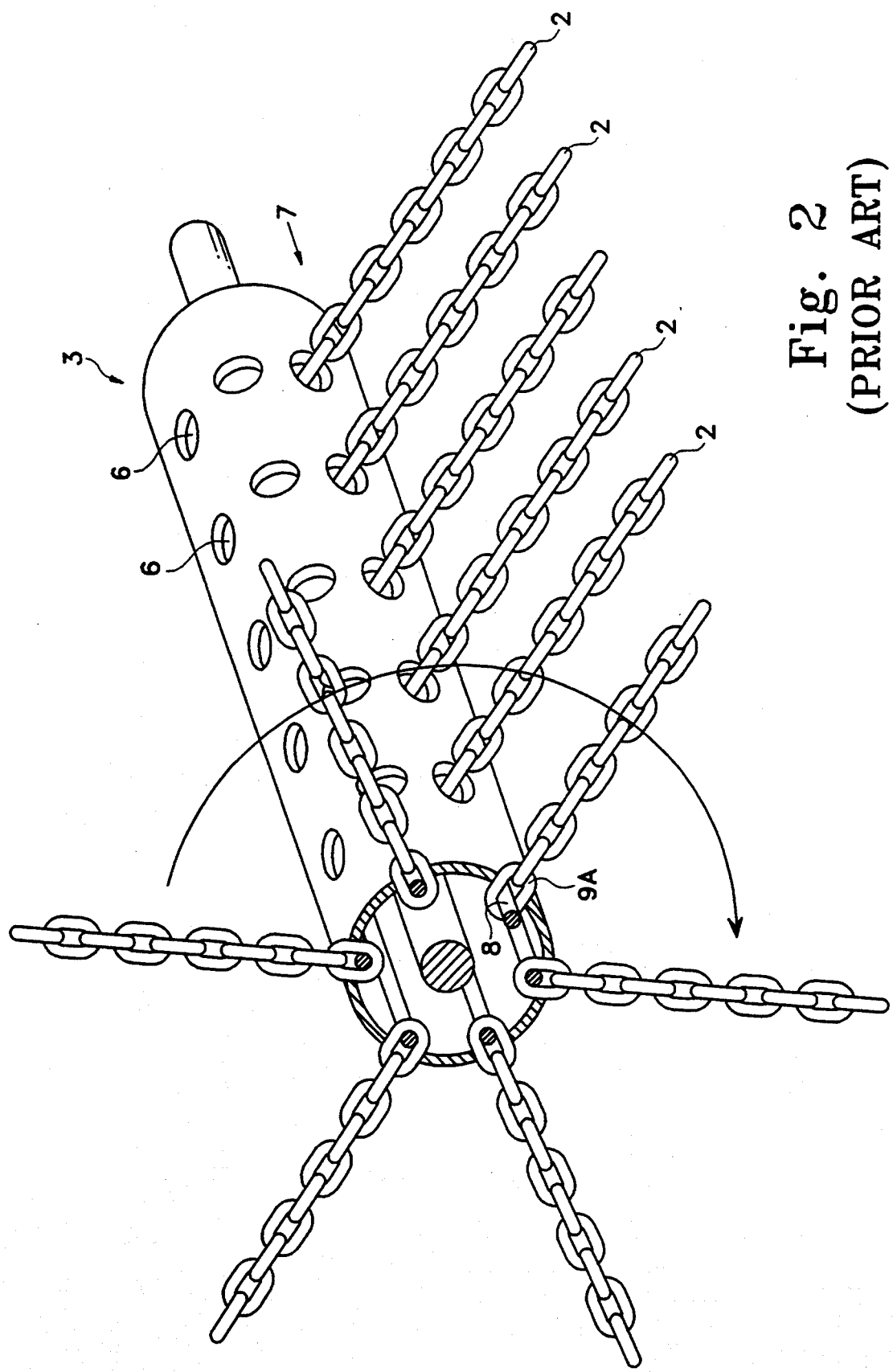
FIG. 2 shows a perspective view, partially cut away, of a debarking flail apparatus.

A typical prior art drum 3 shown in more detail in FIG. 2 is usually a 10" to 12" diameter steel tube with ¾" to 1¼" thick walls, and is 3-4 feet in length. A drum typically has six evenly spaced rows 7 of holes 6 along its length. Each row 7 usually has seven or eights holes 6. The chains 2 are attached by inserting one end of the chain through a hole or slot 6 and passing a steel rod 8 through the end link 9A of the chain 2. A single rod 8 attaches all the chains 2 in a given row 7 on the rotor 3. The holes 6 are usually large enough to allow for installation of a single or double chain to be attached side by side in a single hole 6.

The number of chains 2 installed in a prior art flail debarker 1 will vary with flail design and debarking conditions. One design has 27 chain attachment holes 6 on each of its two drums 3. Another flail design has 45 holes per drum 3. Tree bark is more easily removed in the spring and summer than in the fall and winter. Most flail debarkers need only a single chain per hole to debark logs in the summer while two chains 2 per hole 6 are needed in the winter. Some debarkers can accommodate up to 288 flail chains.

A typical flail chain 2 is a length of standard ⅝" wire diameter, grade 7, transport load binding chain, or grade 8, lifting chain. Each flail debarker design requires a specific maximum length chain. For example, one debarker 1 used in the industry requires a 9 link flail chain 2 that is 18 inches in overall length.

Figure 3:
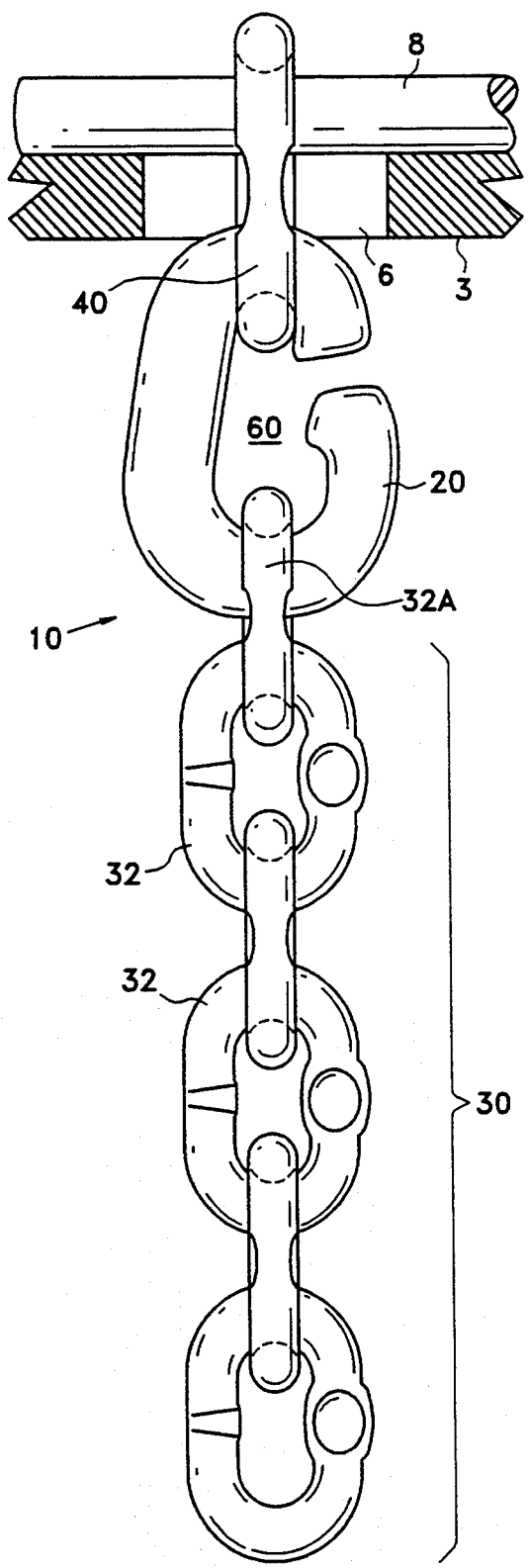
FIG. 3 is a front view of a chain according to the present invention attached to a flail drum. The drum portion is shown as a section through a rotor hole length wise along the rotor.
Figure 4:
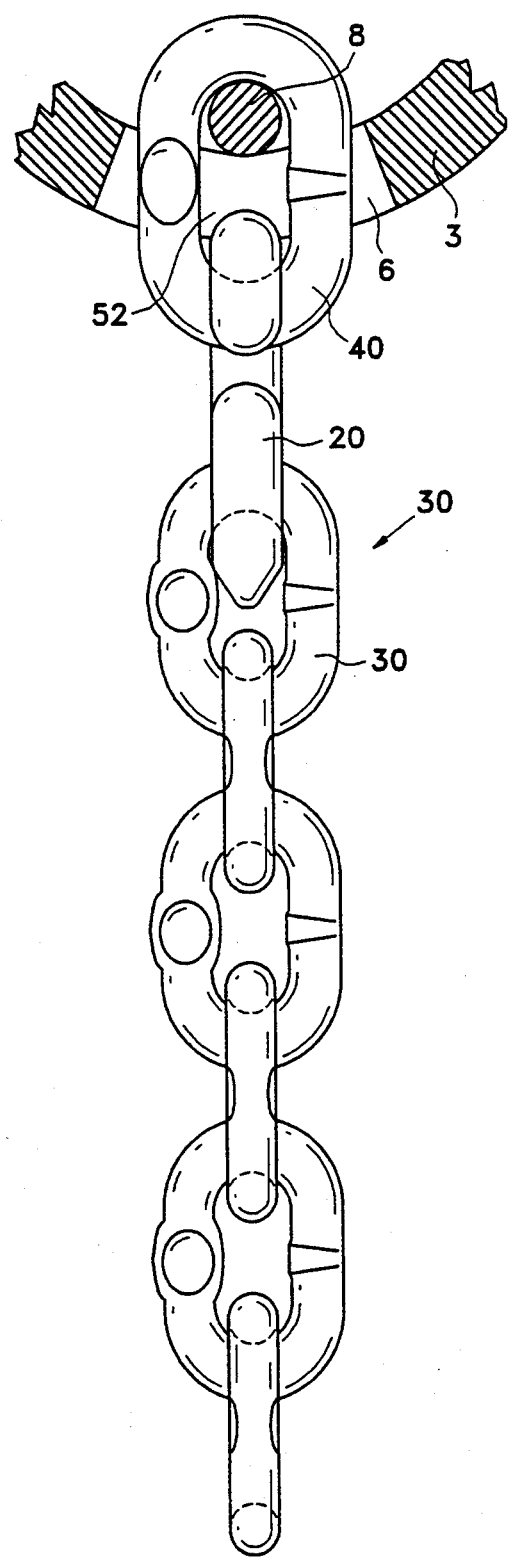
FIG. 4 is a side view of a chain according to the present invention attached to a flail drum. The attachment rod is shown as a cross section through the diameter of the drum and a rotor hole.

Referring now to FIG. 3 and FIG. 4 a debarking chain according to the present invention is referred to in general by numeral 10. The two main components of debarking chain 10 are open link 20 and closed link chain 30.

The quick change fitting, also referred to as an open link 20 is a forged alloy steel link that is roughly in the shape of the letter G. The working chain 30 is suspended from the bottom of the open link 20. The open link 20 is suspended from a connecting or base link 40 that has been inserted in hole 6 in prior art drum 3. Attachment rod 8 has been inserted through the upper end of the interior opening 52 of the base link 40. The base link 40 is secured by and suspends from the prior art attachment rod 8. The interior aperture 60 of the open link 20 can accommodate one base link 40 and up to two working chains 30.

Referring now to FIGS. 5 and 6, open link 20 includes a top first arcuate section 62, a lower second arcuate section 64, a first straight side section 66 and a second straight side section 68 having a slot or opening 21 therethrough. Opening 21 through side 68 forms a lower first terminal end 70 and an upper second terminal end 72 in side 68. For descriptive purposes, the plane of a link is defined as a plane passing through the first and second arcuate sections and first and second straight sections of the link. Further, the major dimension or length of an interior aperture is defined as the greatest dimension or length extending between the interior peripheries of the first and second arcuate sections and the minor dimension or width of interior aperture is defined as the greatest dimension or width extending between the inner peripheries of the first and second straight sections of the link.

Open link 20, including arcuate sections 62, 64 and first and second straight sections 66, 68, may be formed of wire or metal by casting, machining, or forging. In the preferred embodiment, open link 20 is formed by forging.

The cross-sectional shape of various portions of open link 20 are shown in FIGS. 7-12. The shape of various portions of link 20 give the link added strength and help the open link 20 retain the working chains 30. The circular cross section of upper arcuate section 62 of open link 20, shown in FIG. 7, is important because it allows open link 20 to rotate about connecting link 40. The substantially rectangular shaped cross section of lower terminal end 70 in link 20, shown in FIG. 12, is important for allowing the end link 32A of the closed links 32 making up chain 30 to be specifically oriented as it is being inserted over terminal end 70. The tolerance between terminal end 70 and the closed aperture of end link 32A is close so that there is only sufficient clearance for end link 32A to slide over side 68 of open link 20 in a vertical motion, as described in more detail below, when end link 32A is attached to another closed link 32, but having no excess space so that end closed link 32A may not be moved up and down on side 68 by random motion.

Referring now to other FIGS. 8-11, FIG. 8 also illustrates a generally rectangular shape at the transition between first side 66 and upper arcuate section 62. FIG. 9 illustrates the cross sectional shape through the medial portion of first side 66. As shown in FIG. 5, first side 66 includes a protruding portion 74 extending internally into the interior aperture 60 of link 20. The protruding portion 74 has a generally conical shaped cross section as shown in FIG. 9. FIG. 10 illustrates the cross section at the transition between first side 66 and lower arcuate section 64. This cross section is generally circular with a conical shaped cross section directed towards the outer periphery of link 20. FIG. 11 illustrates the cross sectional shape of the lower medial portion of lower arcuate section 64. This cross sectional shape is also generally circular with a conical shaped portion extending towards the outer periphery of lower arcuate section 64.

Figure 13:
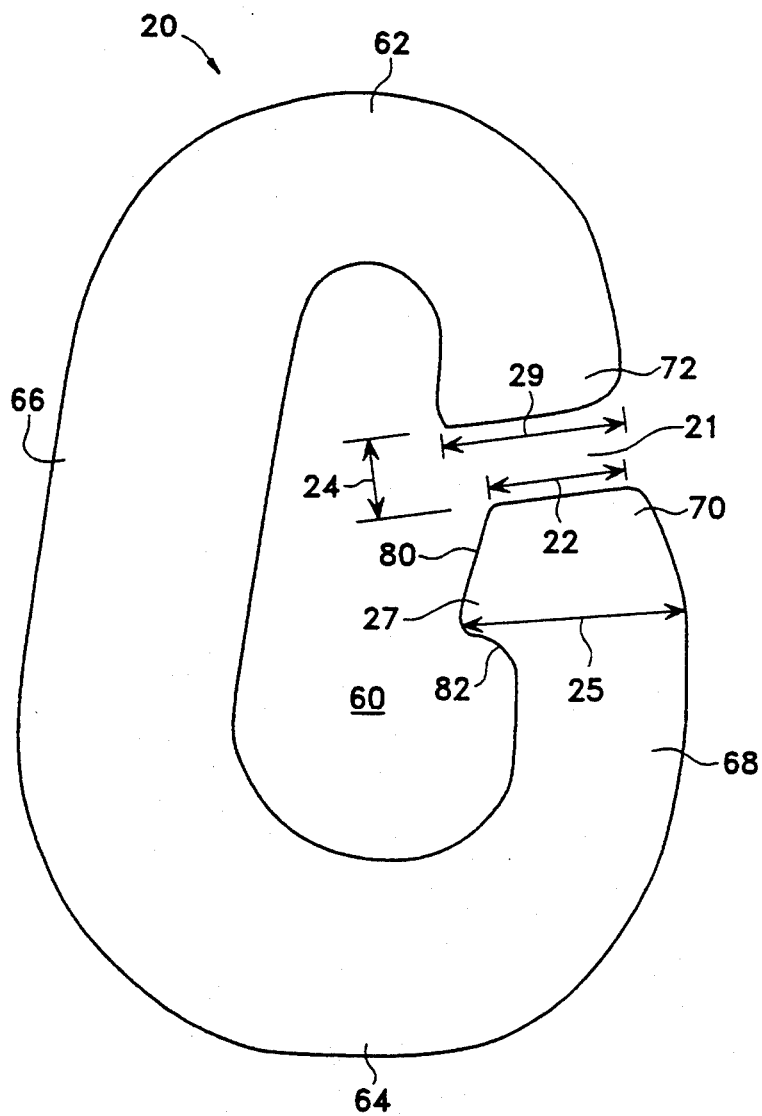
FIG. 13 is a side view of an open link.
Figure 14:
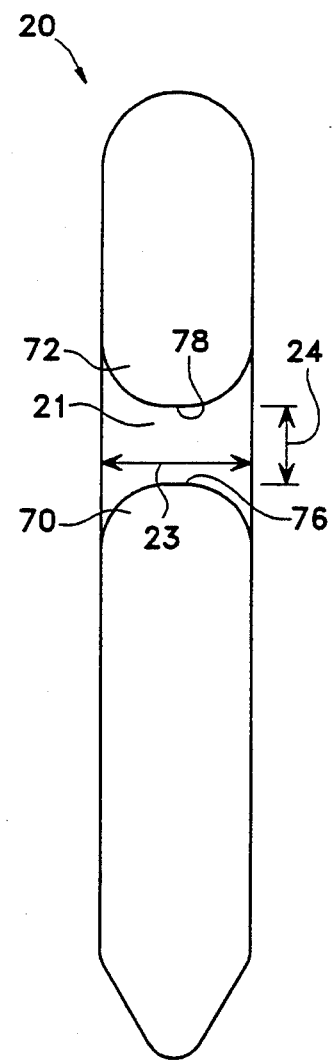
FIG. 14 is a front view of an open link.

FIG. 13 is a side view and FIG. 14 is a front view of the open link 20 without protruding portion 74. As shown, pass opening 21 protrudes inwardly between terminal ends 70, 72 of side 68 into the interior aperture 60 of the guide change fitting 20.

Lower terminal end 70 and upper terminal end 72 form generally flat surface areas 76, 78. The width 23 is the same for both terminal ends 70, 72. Lower terminal end 70 includes a length 22 and upper terminal end 72 includes a length 29. The minimum distance between surface areas 76, 78 of upper and lower terminal ends 72, 70 respectively, determines the height 24 of opening 21. Length 22 and width 23 determine the length and width of pass opening 21 with length 22 being greater than width 23. The height 24 of pass opening 21 is equal to approximately 83% of the wire diameter 31 of end closed link 32A of working chain 30.

Referring now to FIGS. 7, 12, and 13, the inner periphery of lower terminal end 70 increases in size from length 22 to length 25. This increase in length forms a inner tapered surface 80 that is generally parallel to the inner peripheral surface of side 66. Thus, the shape of link 20 directly below the pass opening 21 protrudes inwardly as a smoothly increasing shape to a point about one half inch below the surface area 76 forming the bottom of the pass opening 21. At this point the length 25 is equal to, minus clearance, to the pitch length 27 of the working chain 30 minus the wire diameter 31 of working chain 32. Below the point of maximum inward protrusion, the shape of link 20 decreases abruptly outwardly forming a stop shoulder 82 to assist in maintaining the working chain 32 and the bottom area of interior aperture 60 adjacent lower arcuate section 64 of open link 20.

Figure 15:
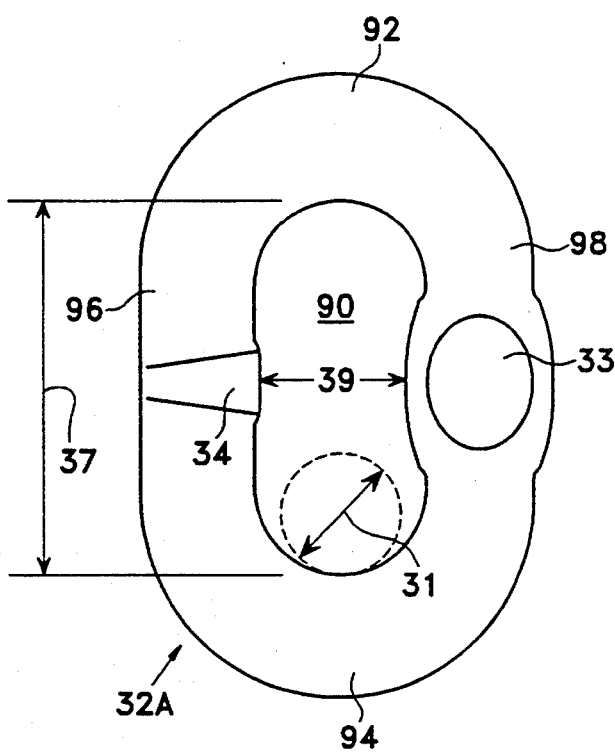
FIG. 15 shows a side view of a closed link of a debarking chain according to the present invention.
Figure 16:
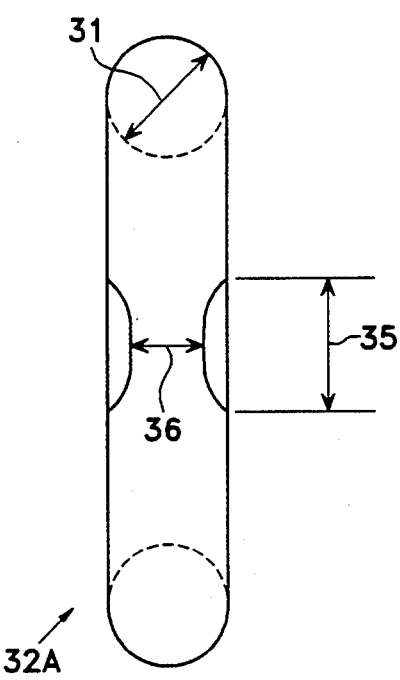
FIG. 16 shows a front view of the closed link shown in FIG. 15.
Figure 17:
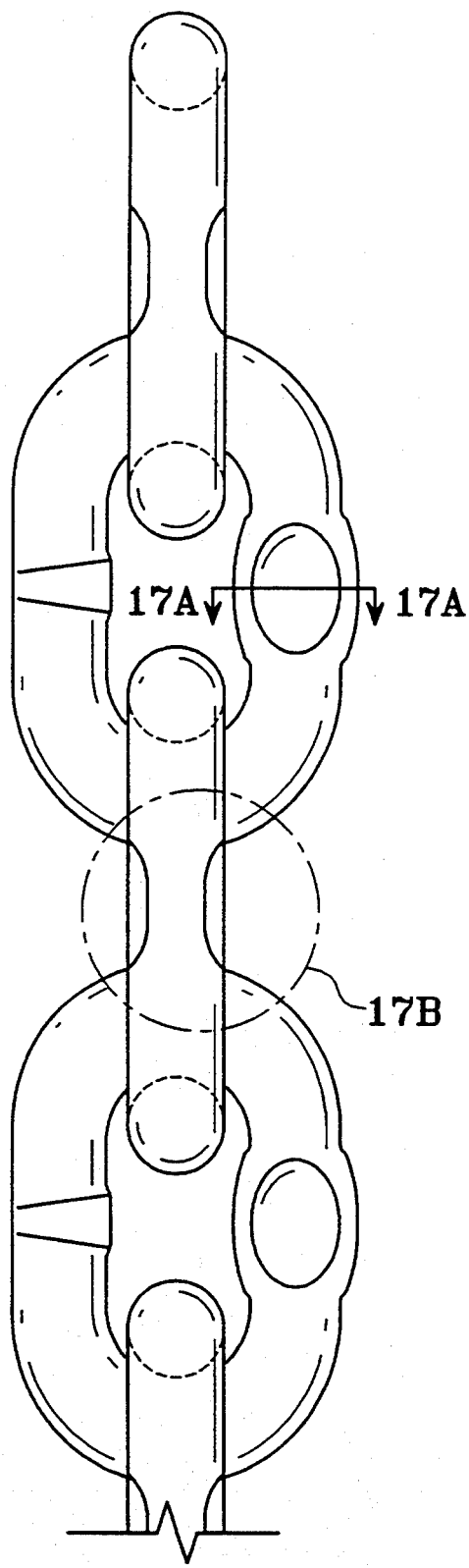
FIG. 17 shows a front view of a section of chain.
Figure 17A:
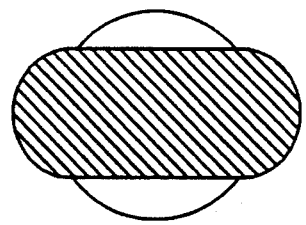
FIG. 17A shows a cross sectional view along lines AA and the debarking chain as shown in FIG. 17.
Figure 17B:
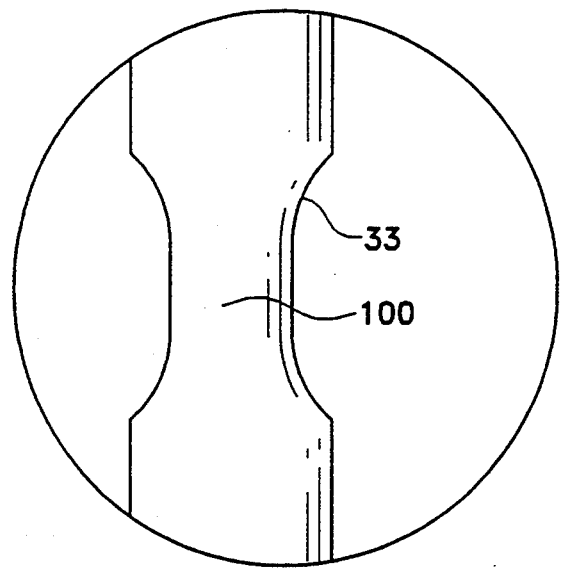
FIG. 17B shows an enlarged view along lines BB of the debarking chain as shown in FIG. 17.

Referring now to FIGS. 15 and 16, there is shown a typical end closed link 32A of working chain 30 made up of a plurality of closed links 32. End closed link 32A includes an upper arcuate section 92, a lower arcuate section 94, a first straight side section 96 and a second straight side section 98. Arcuate sections 92, 94 and sides 96, 98 form a closed wire welded at 34 and forming an interior closed aperture 90. The wire forming arcuate sections 92, 94 and sides 96, 98 is generally circular in cross section having a wire diameter 31. As previously described, end close link 32A includes a plane passing through arcuate sections 92, 94 and sides 96, 98. Interior closed aperture 90 includes a major dimension or length extending between the inner peripheries of arcuate sections 92, 94 and a minor dimension or width extending between the inner peripheries of sides 96, 98.

Referring now to FIGS. 15, 16, 17, 17A and 17B, one of the sides of end closed link 32A includes a reduced dimension portion 100. Reduced dimension portion 100 is preferably disposed at the center of side 98 opposite the weld 34 in side 96. Reduced dimension portion 100 includes parallel flats or indentions 33 on the planar side of side 98. Indentations 33 are generally circular with the flats of indentations 33 extending from the inner periphery to the outer periphery of side 98 along the plane of link 32. The length 35 of the indentions 33 is greater than the width 23 of the pass opening 21 in the open link 20. The width or thickness 36 of reduced dimension portion 100 between indentations 33 is approximately 71% of the wire diameter 31.

The indentions 33 forming reduced dimension portion 100 may be achieved by machining, but in the preferred embodiment they are coined or stamped into the metal. By coining, the total cross sectional area of one of the indentation 33 approximates the area of the original wire cross section. The dimension of the flattened, coined shaped flats is such that reduced dimension portion 100 can slide through the pass opening 21 in open link 20 with small additional tolerance. The flats of indentations 33 and opening 21 work in cooperation so that the plane of closed link 32A must be oriented perpendicularly to the plane of open link 20 whereby the plane of the closed link 32 is approximately 90 degrees to the plane of the open link 20 as shown in FIG. 18.

The result of this geometry is that in order to attach the end working chain link 32A on the quick change fitting 20, the plane of the working chain link must be substantially aligned at right angles to both the plane and the vertical length or axis of the quick change fitting 20. In addition, the reduced dimension portion 100 of the working chain link 32A must be centered relative to the pass opening 21 in the quick change fitting 20. These steps are necessary to prevent the working chain 30 from accidentally coming off of the quick change fitting 20 during debarking.

Figure 19:
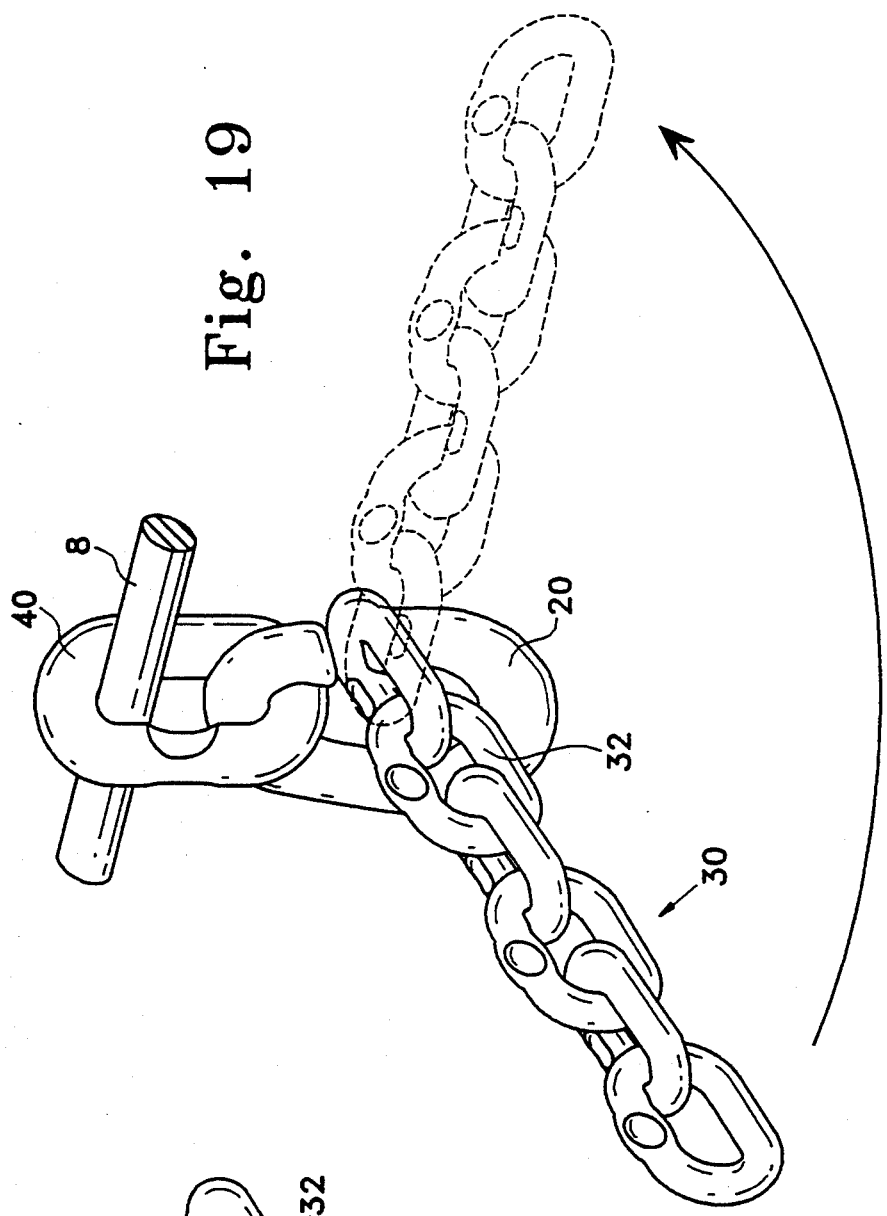
FIG. 19 shows a perspective view partially in phantom with one link of the chain inserted through the open link.
Figure 18:
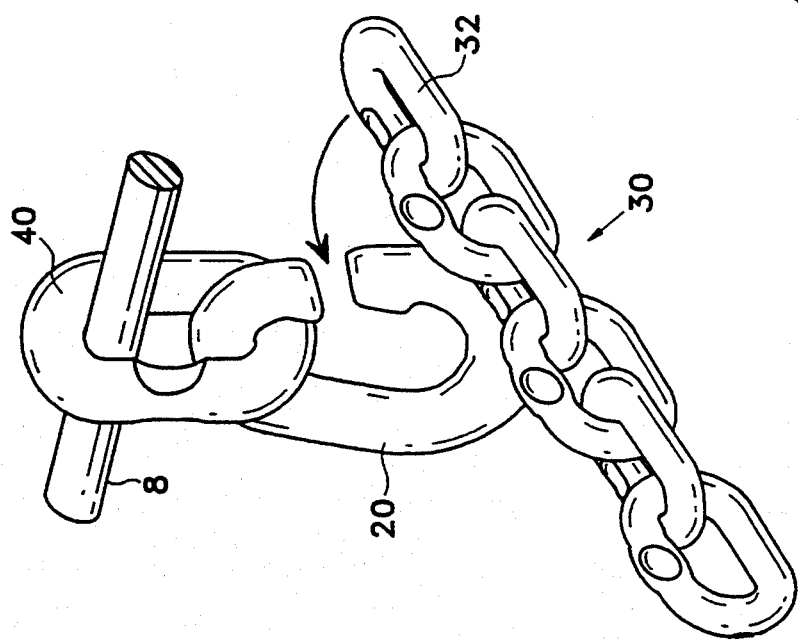
FIG. 18 shows a perspective view of a chain according to the present invention lined up ready for insertion.

Referring now to FIGS. 18-21, in operation the end closed link 32A of chain 30 is attached to open link 20 by performing the following ordered sequences of operations. The plane of the end closed link 32A is aligned 90 degrees to the plane of open link 20 with the length of working chain 30 extending normal or perpendicular to the plane of open link 20 as shown in FIG. 18. The reduced dimension portion 100 of link 32A is aligned with the pass opening 21 of open link 20. The closed link 32A is then moved in a lineal fashion along its minor width or axis, which is approximately aligned with the minor axis of the open link 20 as shown in FIG. 19, so that reduced dimension portion 100 enters pass opening 21.

The length 25 of lower terminal end 70 is greater than the width 39 of closed aperture 90. Thus, lower terminal end 70 will not pass through closed interior aperture 90 when the planes of links 20, 32 are in the perpendicular position shown in FIG. 18. FIG. 19 illustrates a "no-go" position.

Figure 21:
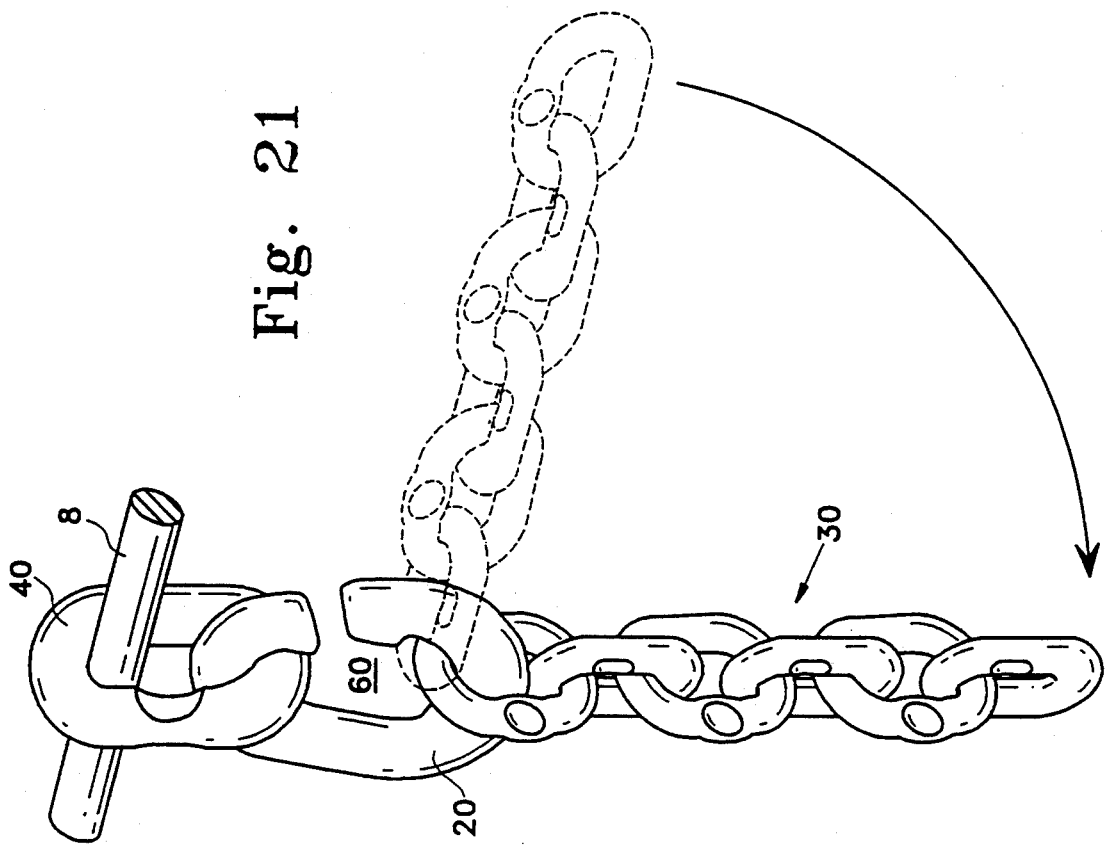
FIG. 21 shows a chain according to the present invention partially in phantom which has been rotated downward to the locking position.
Figure 20:
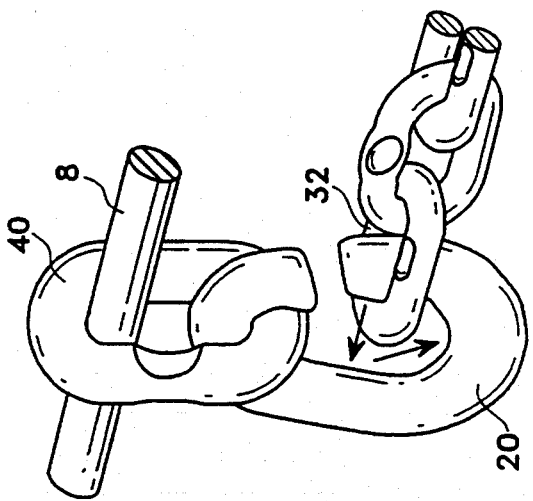
FIG. 20 shows a chain according to the present invention moved vertically downward on the open link.

The end closed link 32A of working chain 30 is rotated 90° such that its length is in the plane of the quick change fitting 20 and perpendicular to the vertical length or axis of the fitting 20 as shown in phantom FIG. 19. As shown in phantom in FIG. 19, upon the rotation of end closed link 32A, the length 25 becomes aligned with the length 37 of closed aperture 90 of end closed link 32A whereby interior closed aperture 90 will receive the lower terminal end 70 of open link 20 as shown in FIG. 20. In FIG. 20, the working chain 30 is moved horizontally toward the open link 20 and then downwardly to the bottom of the interior aperture 60 of the fitting 20 as interior closed aperture 90 receives terminal end 70 and thus side 68 of open link 20. In FIG. 21, the working chain 30 is rotated 90° such that its length is in the plane of the quick change fitting 20 and parallel to the vertical length or axis of the fitting 20.

The main intent of the design of the quick change fitting 20 and working chain 30 combination is to minimize the possibility that a working chain 30 will accidentally come off during random motion of the debarking operation. When a working chain 30 strikes a log during debarking, a random motion is imparted to the chain. These random motions occur at a rate of about 12-16 million per day in a typical flail debarker. The design of the quick change fitting 20 and working chain 30 combination requires that a sequence of specific motions occur for a working chain 30 to accidentally come off a quick change fitting 20. These motions are:

The working chain 30 must rotate 90° as shown in FIG. 21 such that its length is in the plane of the quick change fitting 20 and perpendicular to the vertical length or axis of the fitting 20;

The chain 30 must then move in a horizontal direction toward the interior of the quick change fitting 20 such that the arcuate section of the end closed link 32A clears stop shoulder 82;

The chain 30 must then move, counter to centrifugal force, upward to a position where arcuate section 92 of end closed link 32A is adjacent to the pass opening 21 in the quick change fitting 20 as shown in Figure 20;

The working chain 30 must then rotate 90° as shown in FIG. 19 such that its length is aligned perpendicular to both the plane and the vertical length or axis of the quick change fitting 20. This rotation must also be in a direction such that, after completion, the side 98 with the reduced dimension portion 100 of the end link 32A is in the interior aperture 60 of the quick change fitting 20;

The end link 32A must move laterally relative to the plane of the fitting 20 such that the reduced dimension portion 100 in the end link 32A align with the pass opening 21 of the quick change fitting 20;

Finally, the chain 30 must move and translate in the plane of the fitting 20 in a direction such that the reduced dimension portion 100 in the end link 32A pass through the opening 21 in the quick change fitting 20 as shown in FIG. 18.

Figure 22A:
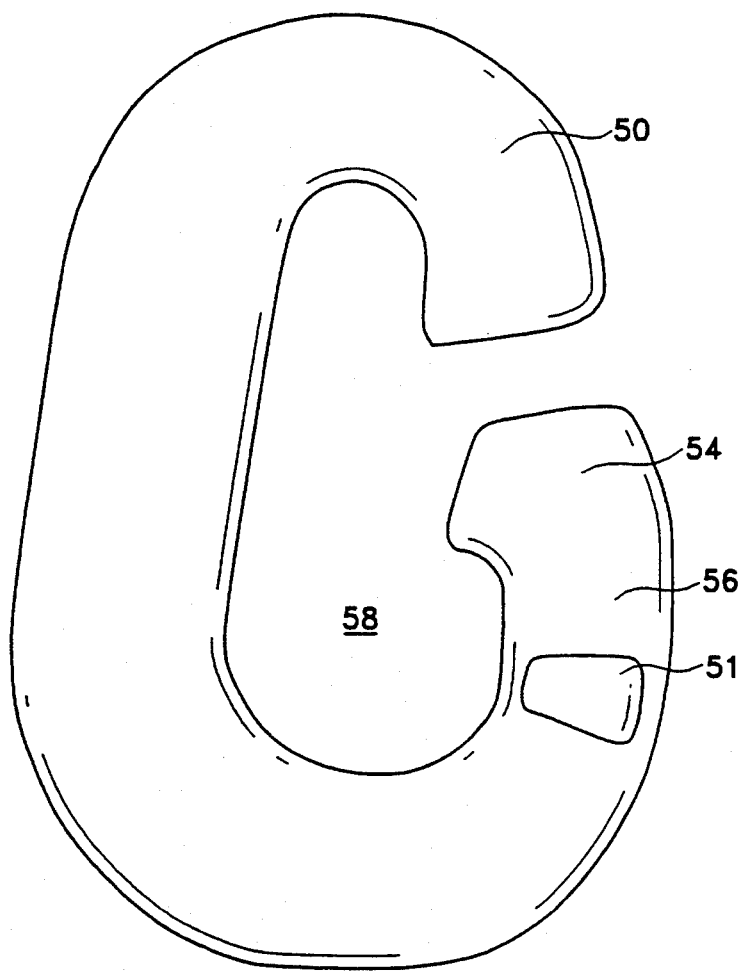
FIG. 22A and FIG. 22B show an alternate embodiment of the open link.
Figure 22B:
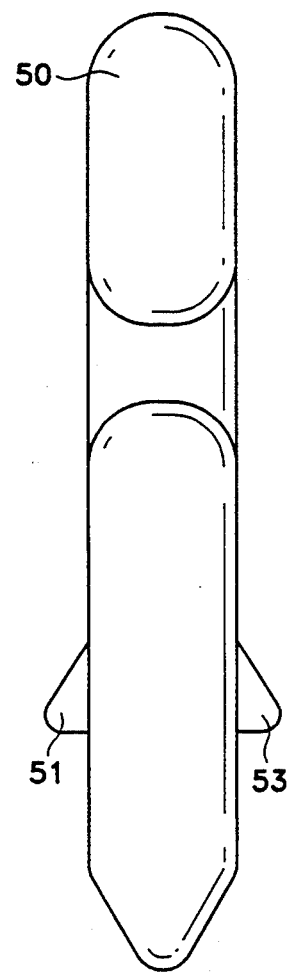
Figures 23, 24:
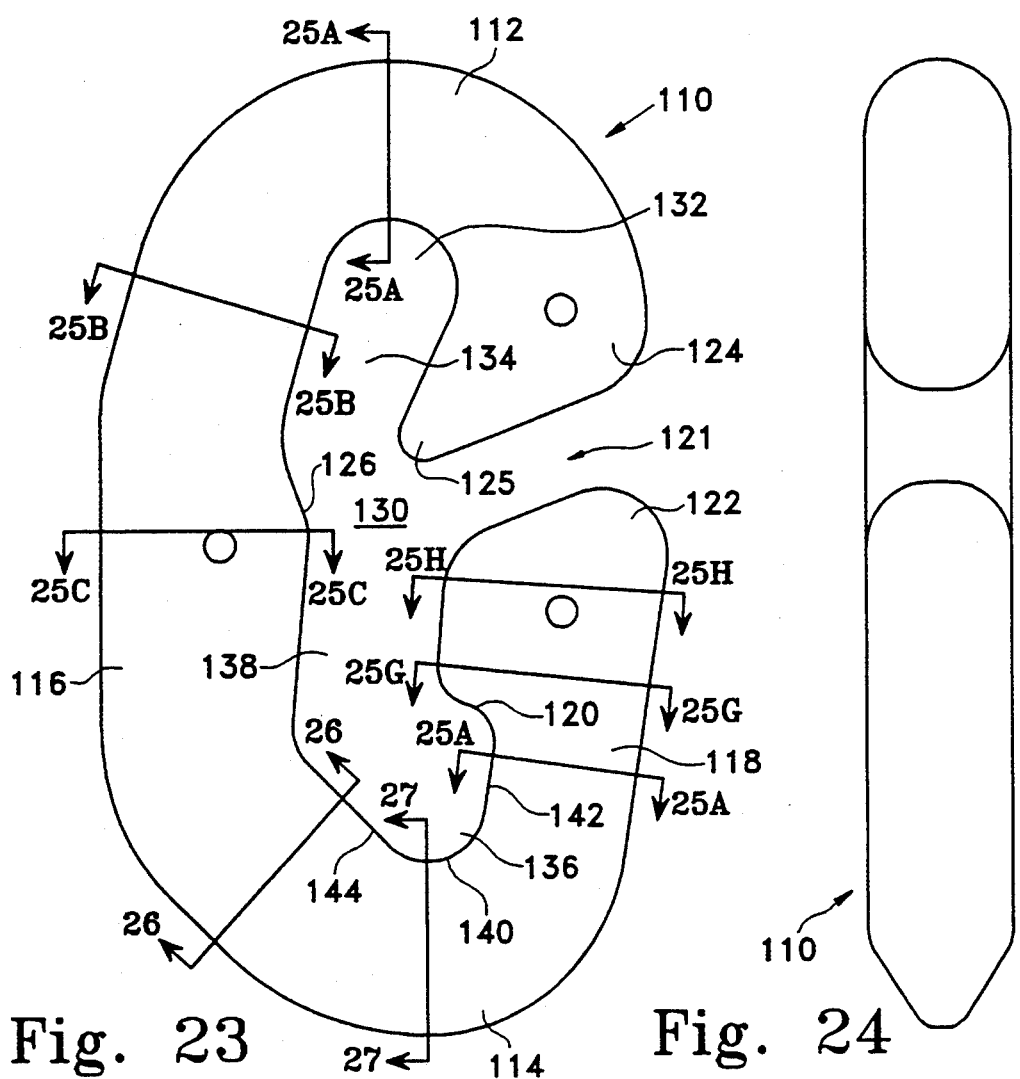
FIG. 23 shows a side view of yet another embodiment of the open link.
FIG. 24 shows an end view of the open link shown in FIG. 23.

FIGS. 22A and B illustrate an alternative quick change fitting 50. Fitting 50 has been lengthened vertically to allow for the addition of a pair of stops 51, 53 projecting in a direction normal to the plane of fitting 50. Stops 51, 53 are located below the lower terminal end 54 of straight side 56 of fitting 50. The stops 51, 53 require certain additional movements of working chain 30 before working chain 30 can reach the horizontal position as shown in phantom in FIG. 21. The following additional sequence of steps will be required to remove working chain 30.

The working chain 30 must rotate 90° such that its length is aligned perpendicular to both the plane and the vertical length and axis of the quick change fitting 50;

The chain 30 must then move counter to centrifugal force upward to pass stops 51, 53 through the length 37 of closed interior aperture 90 of end link 37A to a position directly above the stops 51, 53 on the side 56 of the quick change fitting 50;

The working chain 30 must then rotate 90° in the horizontal plane such that its length 37 is in the plane of the quick change fitting 50 and perpendicular to the vertical length and axis of the fitting 50 to continue with the sequence of movements previously described with respect to fitting 20.

FIGS. 23 through 27 show yet another embodiment of the open link. This embodiment functions as described above with additional improvements and is particularly adapted for accommodating two working chains connected to one open link. Open link 110 includes a first upper arcuate section 112, a second lower arcuate section 114, a first straight side section 116 and a second straight side section 118. Side 118 includes a pass opening 121 forming a lower terminal end 122 and a upper terminal end 124 in side 118. Open link 110 is generally G-shaped.

Figure 25A:
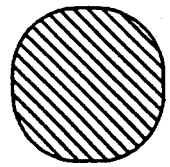
FIG. 25 shows a cross sectional view of the link shown in FIG. 23 along lines AA, BB, CC, GG, or HH.
Figure 25C:
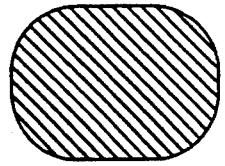
Figure 26:
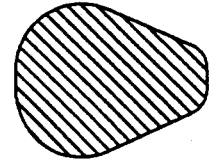
FIG. 26 shows a cross sectional view of open link shown in FIG. 23 along lines DD.
Figure 25B:
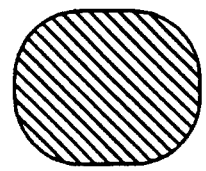
Figure 25G:
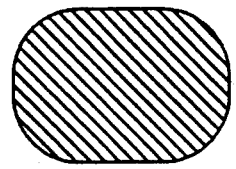
Figure 27:
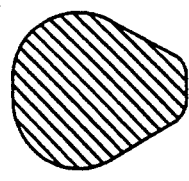
FIG. 27 shows a cross sectional view of the open link shown in FIG. 23 along lines EE.
Figure 25H:
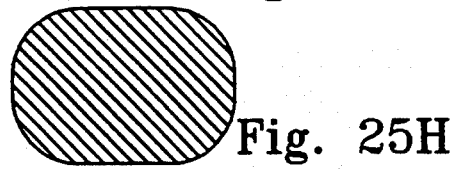

Referring particularly now to FIGS. 25A–H, 26 and 27, there are illustrated the various cross sectional shapes of open link 110 at various locations through the arcuate and straight sections. FIG. 25A illustrates a shape which is generally circular or square with rounded corners at the mid section of upper arcuate section 112. FIG. 25B illustrates the cross section at the transaction between upper arcuate section 112 and side 116 as being generally rectangular shaped. FIG. 25C illustrated the cross section of side 116 as its mid portion and illustrates a rectangular shape cross section, having a length slightly greater than the length of the cross sectional shape shown in FIG. 25B so as to form a protruding transition 126 into the open interior aperture 130 of link 110. FIG. 26 illustrates the cross sectional shape at the transition between side 116 and lower arcuate section 114 with such shape being generally circular but having a conical shaped side directed toward the exterior of link 110. FIG. 27 illustrates the cross sectional shape at the mid point of lower arcuate section 114 as also being generally circular having one side thereof being conical shaped and directed toward the exterior of link 110. FIG. 25A also illustrates the cross sectional shape through the transition portion between side 118 and lower arcuate section 114 as being similar to that at the cross section at the mid point of upper arcuate section 112. Such shape is generally circular or a square with rounded corners. FIG. 25G is a cross section through the lower portion of lower terminal end 122 and illustrates a generally rectangular shaped cross section forming a stop shoulder 120. FIG. 25H illustrates a cross section through the upper portion of terminal end 122 as also being generally rectangular in shape but having a length greater than the rectangular length shown in FIG. 25G with respect to the lower portion of lower terminal end 122.

The above described cross sectional shapes of the various straight and arcuate sections of open link 110 form a predetermined configuration of the open interior aperture 130. Such cross sectional shapes cause open interior aperture 130 to include an upper mounting area 132, a channel area 134 extending from the inner side of pass opening 121 to upper mounting area 132, a lower mounting area 136, and a lower channel 138 extending from the inner side of pass opening 121 to lower mounting area 136. In particular, upper and lower channels 134, 138 are formed by generally parallel sides of the rectangular cross sectional shapes of sides 116, 118. Upper mounting area 132 is generally arcuate due to the inner periphery of upper arcuate section 112, and lower mounting area 136 includes an arcuate portion 140 having a generally flat side 142 extending to stop shoulder 120 and on the other side of arcuate portion 140 a flat transition side 144.

Pass opening 121 is similar to that of pass opening 21 of the preferred embodiment. However, where pass opening 21 of the preferred embodiment is generally perpendicular to the axis of side 68, pass opening 121 of fitting 110 has an axis with an angle of approximately 20 degrees with respect to the vertical axis of side 118. Also, upper terminal end 124 includes an extended inwardly directed and generally pointed end 125 to form one side of upper channel 134.

Referring now to FIGS. 28–31, the reduced dimension portion 100 of base link 40 is aligned with pass opening 121. Base link 40 by a generally horizontal translational movement passes reduced dimension portion 100 through pass opening 121. Base link 40 is then rotated 90 degrees to align the length of its interior closed aperture 90 with the length of lower terminal end of 122. The distance between the straight sides forming upper and lower channels 134 and 138 is sized to be greater than the wire diameter of 31 such that the arcuate section of base link 40 will pass upwardly through upper and lower channels 134 and 138 and rest against the inner periphery of upper arcuate section 112 in upper mounting area 132. See FIG. 28.

When two chains are used, the first chain 30 is installed as described above. The reduced dimension portion 100 of end closed link 32A is aligned with pass opening 121 such that the plane of link 32A is perpendicular to the plane of open link 110. Reduced dimension portion 100 is passed through opening 121 by transactional movement until the reduced dimension portion 100 is disposed within open interior aperture 130. The end closed link 32A is then rotated 90 degrees to align the length of lower terminal end 122 with the length 37 dimension of closed interior aperture 90. End closed link 32A is then moved downwardly by passing lower terminal end 122 through closed interior aperture 90 by passing the arcuate end of end close link 32A through lower channel 138 and into lower mounting area 136. To assemble a second working chain 150, it is necessary to continue the insertion or threading of first the lower arcuate section 114 and then the other side 116 through closed interior aperture 90 until the end closed link 32A and working chain 30 are passed into upper channel 134 to provide clearance for the attachment of the second working chain 150.

Figure 29:
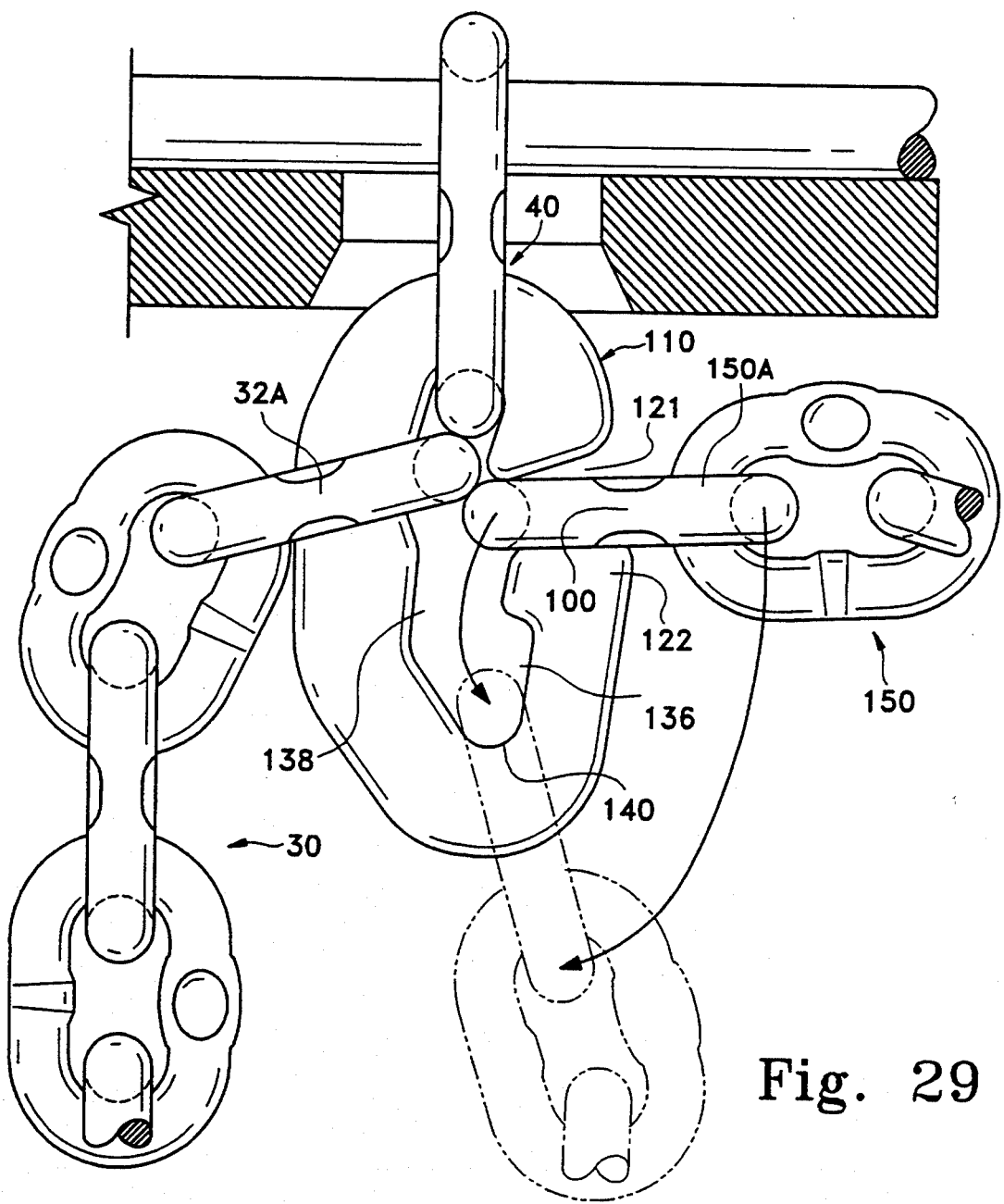
FIG. 29 shows a front view of the present invention using a first and second chain.
Figure 28:
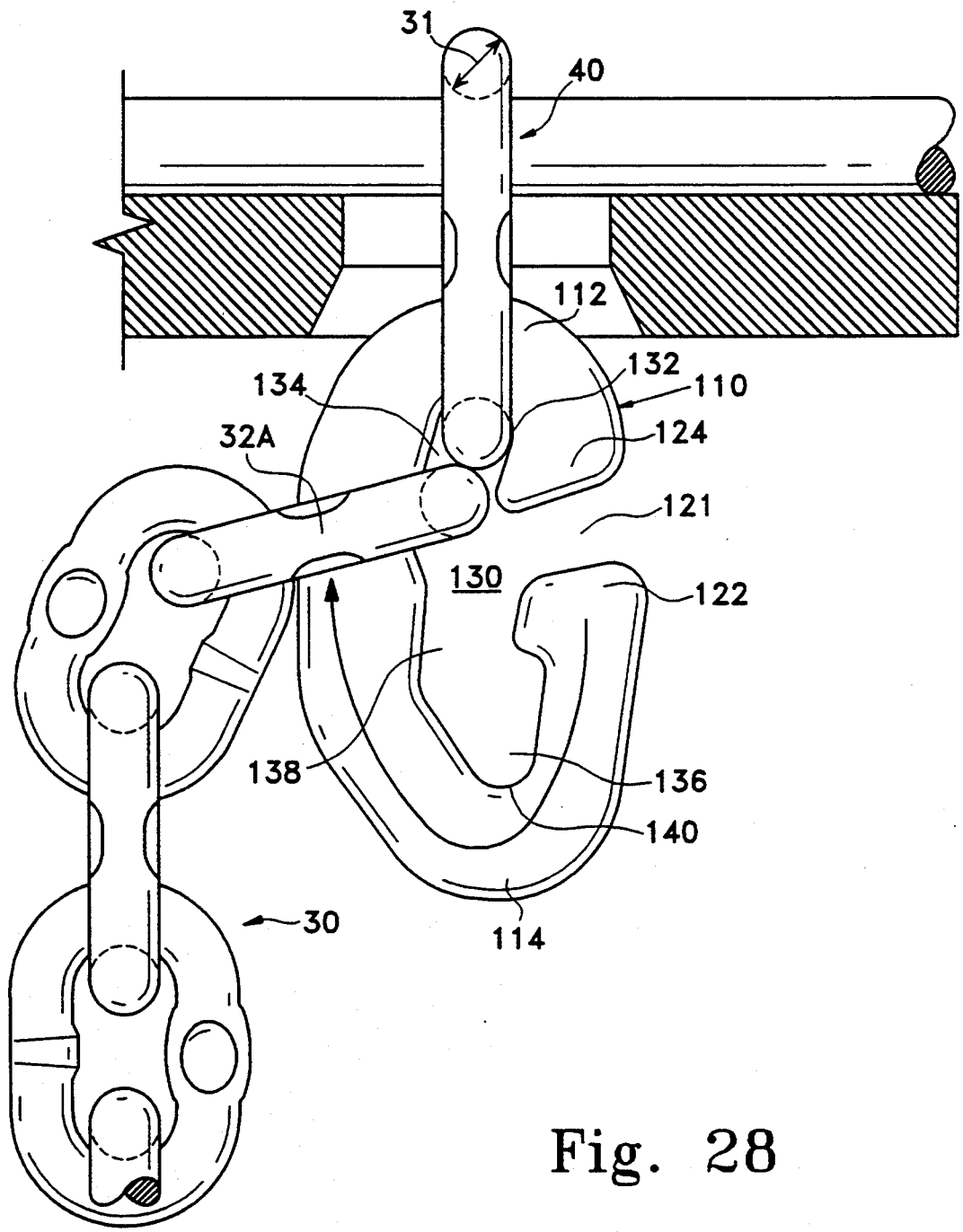
FIG. 28 shows a front view of the present invention using a first and second chain.

As best shown in FIG. 29, the second working chain 150 is then attached to open link 110. The end closed link 150A is aligned with fitting 110 such that the plane of close link 150A is perpendicular to the plane of fitting 110. Reduced dimension portion 100 is centered and aligned with pass opening 121 and reduced dimension portion 100 is passed through pass opening 121 by a translational movement. The end closed link 150A is then rotated 90 degrees to align the length dimension of lower terminal end 122 with the length dimension of closed interior aperture 90 of end closed link 150A. The arcuate section of end closed link 150A is then passed through lower channel 138 into lower mounting area 136 such that the arcuate section of end closed link 150A rests on the arcuate portion 140 of lower mounting area 136.

Figure 30:
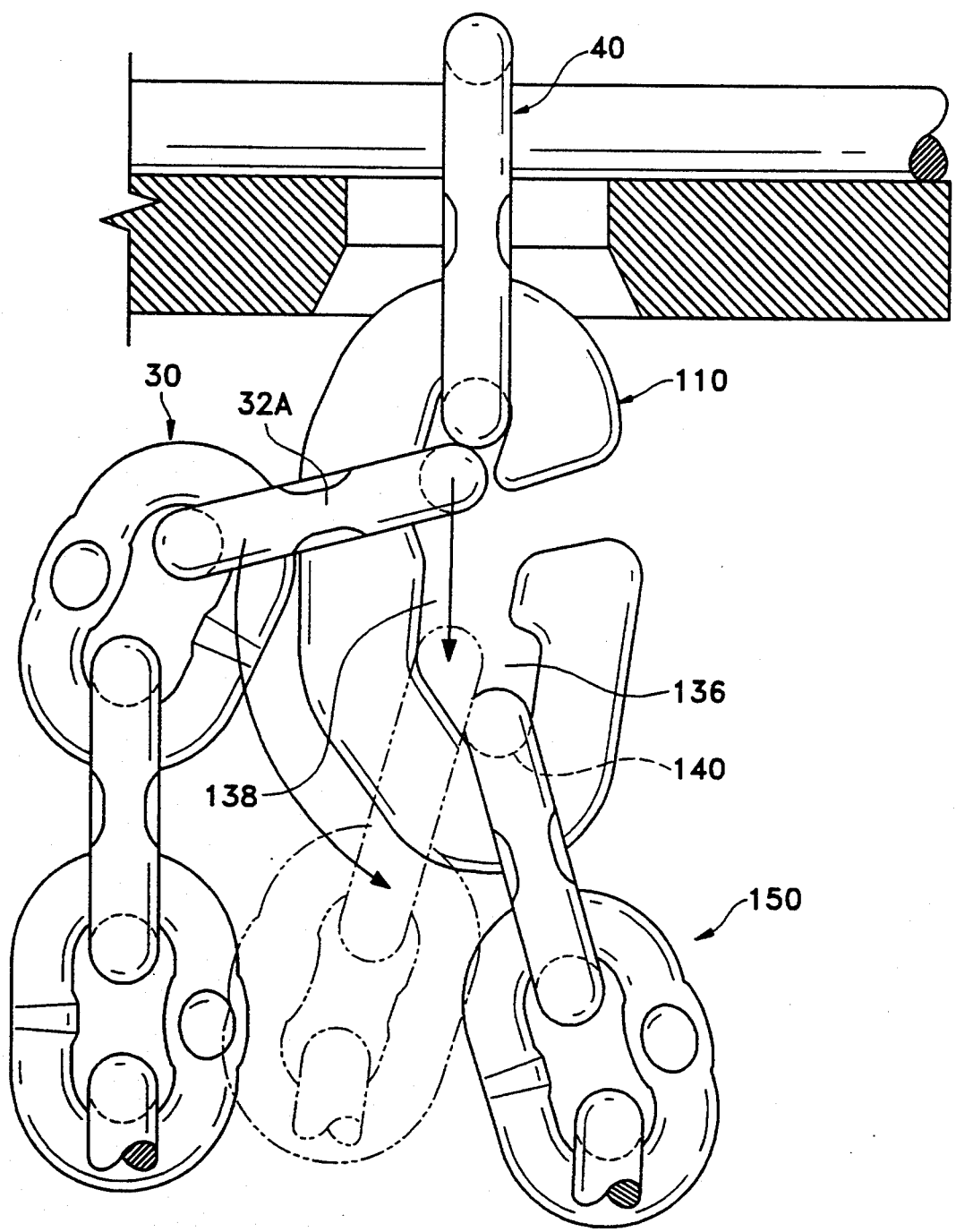
FIG. 30 shows a front view of the present invention using a first and second chain.
Figure 31:
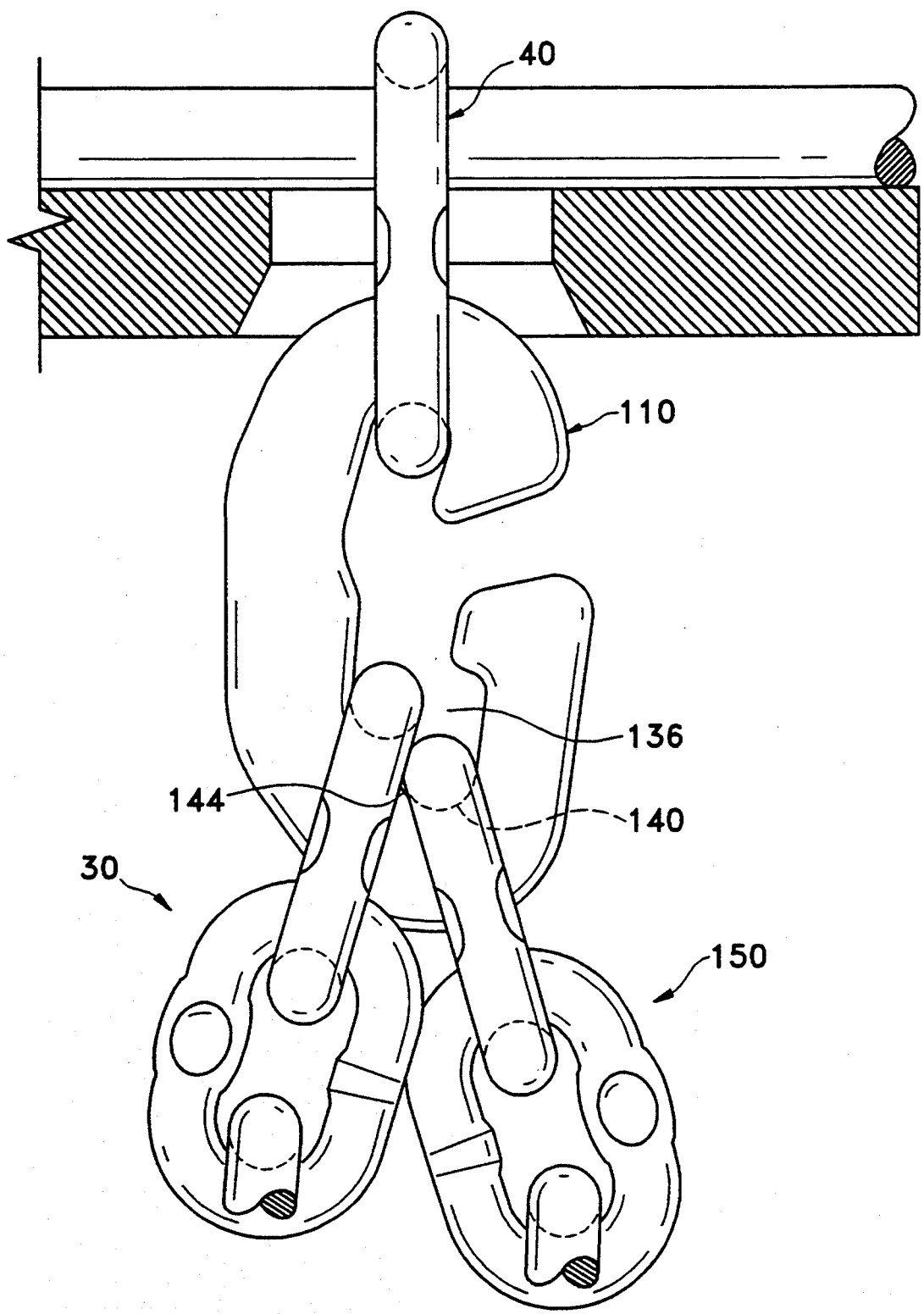
FIG. 31 shows a front view of the present invention using a first and second chain.

Referring now to FIGS. 30 and 31, once second working chain 150 is in position in the lower mounting area 136 against arcuate portion 140, the end closed link 32A of the first working chain 30 is then passed downwardly through lower channel 138 to rest against the transition side 144 of lower mounting area 136, as shown in FIG. 31.

As previously described, the first working chain 30 must be moved all the way from the entry point up into the upper channel 134 before the second working chain 150 can be installed. After the second working chain 150 is installed, the first working chain 30 can be moved down into the lower mounting area 136. The first working chain 30 locks the second working chain 150 in place and prevents the loss of the second working chain 150 during operation.

To remove the second working chain 150, the procedures are reversed with the first working chain 30 being moved up once again into the upper channel 134 to allow the removal of the second working chain 150 as described above. The first working chain 30 can then be removed as previously described in reverse order.

Figures 32, 33:
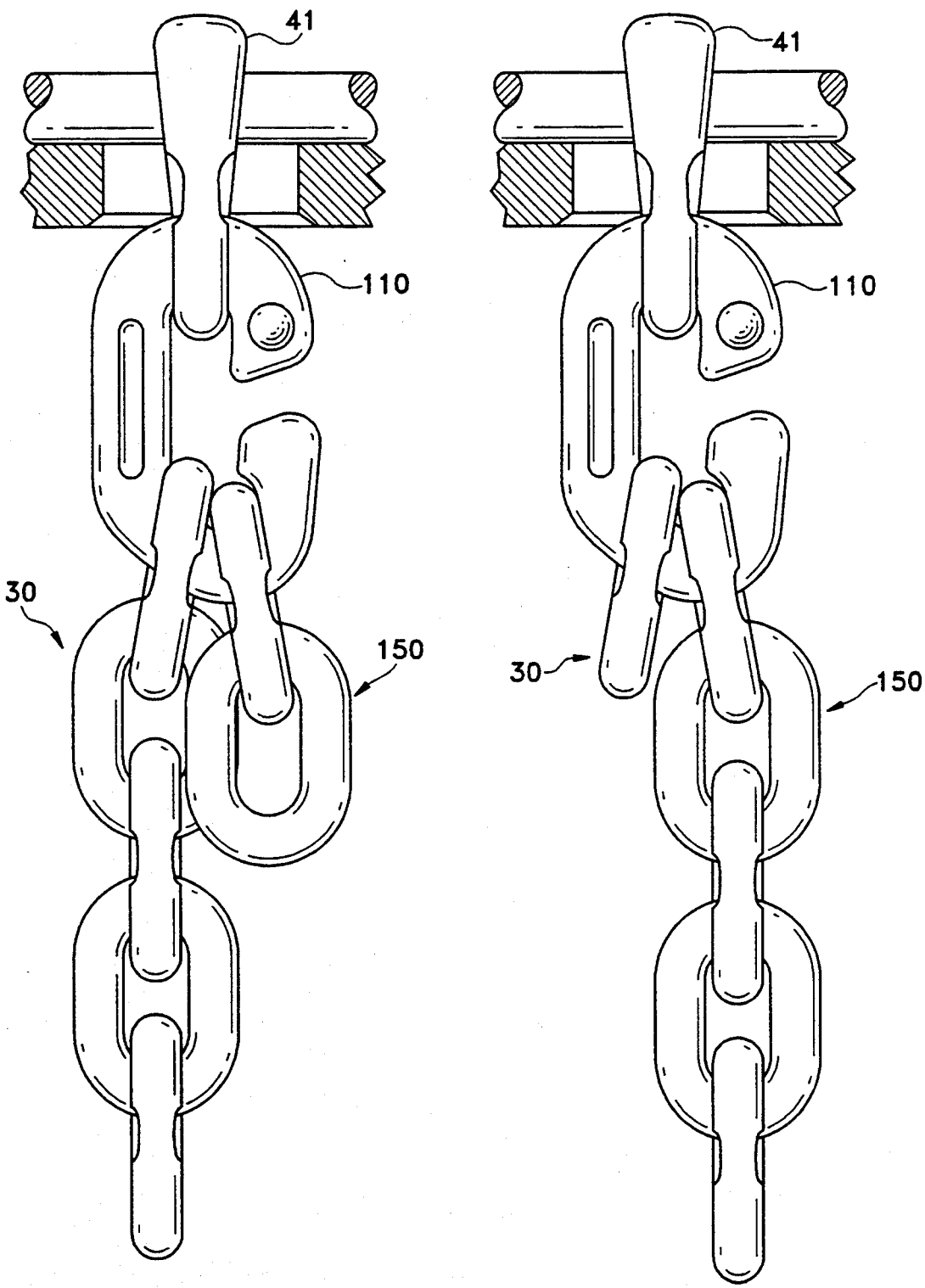
FIG. 32 shows a front view of an alternate embodiment of a two flail debarking chain with the second flail having two links.
FIG. 33 shows a front view of another embodiment of the invention with first flail having one link.

FIG. 32 shows an alternate embodiment of the invention wherein second chain 150 is only two links long. This embodiment may be used wherein a worn out piece of chain 150 is used solely for locking first chain 30 in place. FIG. 33 shows yet another embodiment of this invention wherein first chain 30 is only one link long. A worn out length of chain may also be used solely for locking purposes or chain 30 may be a specially designed link.

Figure 34:
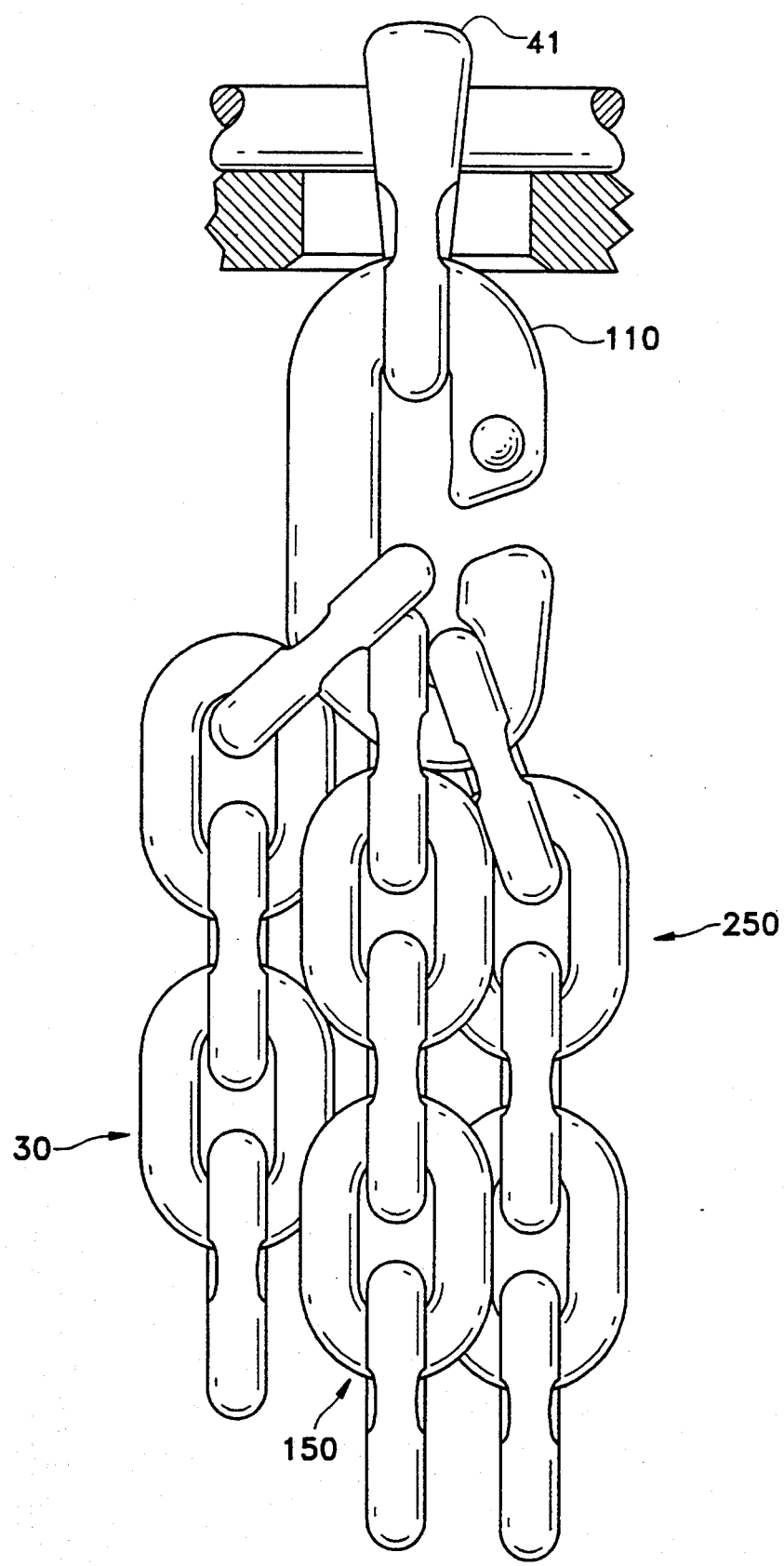
FIG. 34 shows a debarking chain with three chain flails attached.

FIG. 34 shows an embodiment of the invention having a third chain 250 added as described above. First chain 30 and second chain 150 would be moved upward on open link 110 for the installation for removal of third chain 250. Likewise, more than three chains can be used if desired. In these embodiments open link 110 would have to be long enough to accommodate the upward movement of first chain 30, second chain 150, or any additional chains while the last chain is being added.

Figure 35:
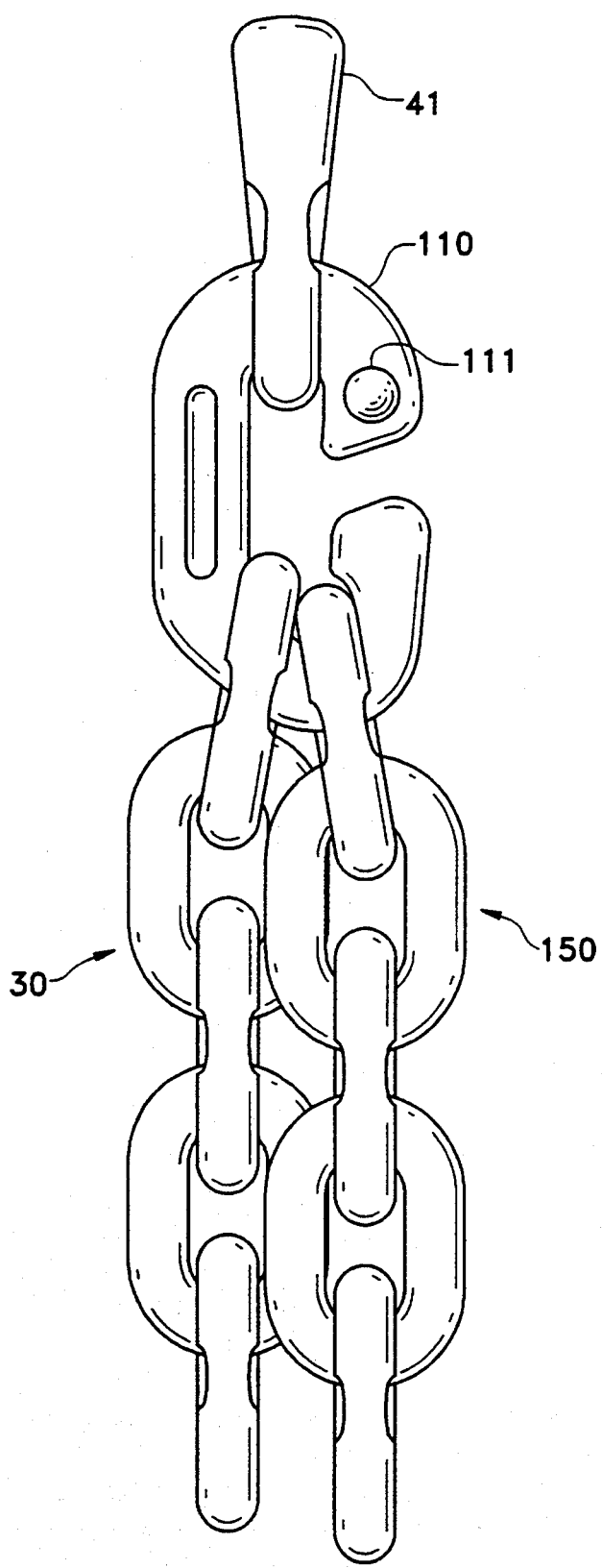
FIG. 35 shows a two flail debarking chain with a stop means on the open link.
Figure 36:
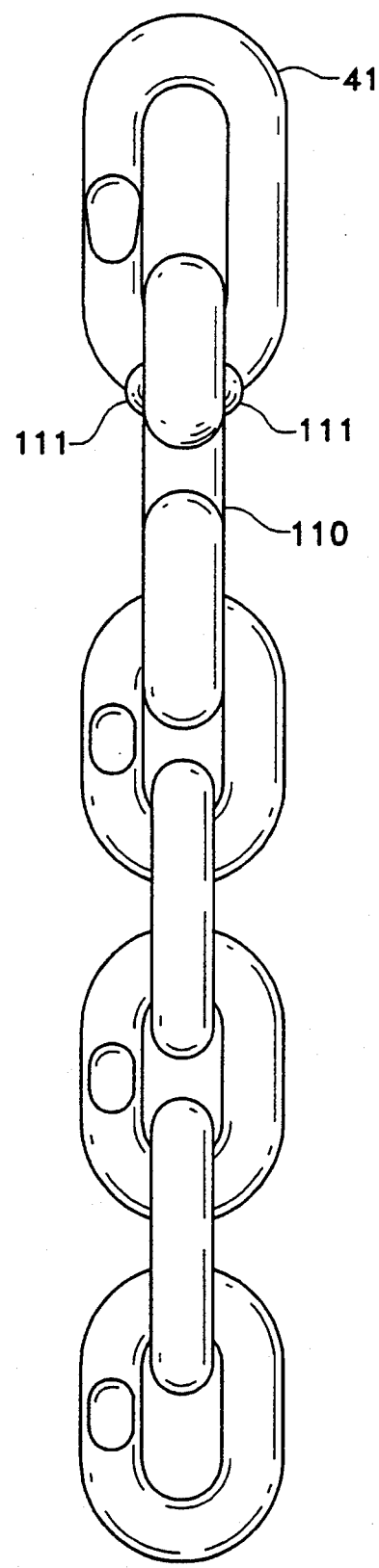
FIG. 36 is a side view of the embodiment shown in FIG. 35.

FIGS. 35 and 36 show an embodiment wherein a stock means or retaining means 111 prevents link 110 from being removed from rotor link 41 prior to the working chains being removed.

For reference purposes and ease of description, the links and working chain have been described with the working chain being suspended and hanging from the drum in the vertical direction due to gravity. In such a position, the links and chain may be described as having upper and lower parts and vertical and horizontal positions. It should be appreciated that such terms are being used for reference and description purposes only and should not limit the scope of the present invention.

While the preferred embodiment of the invention has been shown and described, modifications thereof can be made by one skilled in the art without departing from the spirit of the invention.

I claim:

1. A debarking chain with a quick disconnect for attaching the debarking chain to a rotating member comprising:
    an open link having one side with an opening, said open link opening forming a terminal end in said one side, said terminal end having a cross section with a width and a length;
    a first chain comprised of closed links with a first closed end link having an interior aperture with a width and length, said first closed end link having a reduced cross section;
    a second chain comprised of closed links with a second closed end link having an interior aperture with a width and a length, said second closed end link having a reduced cross section;
    said cross section length being greater than said aperture widths and smaller than said aperture lengths;
    said first and second closed end links with said first and second chains being removably attached to said open link by a series of translational and rotational movements; and
    wherein said first chain must be moved past said opening prior to attaching or removing said second chain.

2. A debarking chain as in claim 1 wherein said reduced cross section is substantially oval in cross section.

3. A debarking chain as in claim 1 wherein said reduced cross section is coined into said first and second closed end links.

4. A debarking chain as in claim 1 wherein said reduced cross section and said opening in said open link have a close tolerance.

5. A debarking chain as in claim 1 where in said opening in said open link is substantially rectangular in cross section.

6. A debarking chain as in claim 1 where n said open link includes a base which is substantially tear-drop shaped.

7. A debarking chain as in claim 1 wherein said open link is includes a top which is substantially circular in cross section.

8. A debarking chain as in claim 1 wherein said open link is essentially flat on a front and a back face.

9. A debarking chain as in claim 1 wherein said open link is forged.

10. A debarking chain as in claim 1 further including a connecting link removably attached to said rotating member and said open link.

11. A debarking chain as in claim 10 wherein said connecting link includes a reduced cross section for passage through said opening.

12. A debarking chain as in claim 10 further including a rod for attaching said connecting link to the rotating member.

13. A debarking chain as in claim 1 wherein said series of translational and rotational movements includes aligning said reduced cross section with said opening, moving said reduced cross section through said opening, rotating said first closed end link to align said lengths, and passing said cross section length through said aperture length to connect said chain to said open link.

14. A debarking chain as in claim 1 wherein said open link opening forms another terminal end of said one side, said other terminal end having a cross section with a width and a length.

15. A debarking chain as in claim 14 wherein said cross section length of said other terminal end is greater than said aperture width and smaller than said aperture length.

16. A debarking chain as in claim 14 further including a connecting link having an interior aperture with a width and a length.

17. A debarking chain as in claim 16 wherein said cross section length of said other terminal end is greater than said aperture width of said connecting link and smaller than said aperture length of said connecting link.

18. A debarking chain as in claim 1 further including at least one protruding member protruding from said one side of said open link in a direction perpendicular to said cross-section length.

19. A debarking chain as in claim 18 wherein said first closed end link is rotated to align said protruding member with said aperture length for connecting said chain to the rotating member.

20. A debarking chain with a quick disconnect for attaching the debarking chain to a drum comprising:
 a connecting link attached to the drum;
 an open link removably attached to said connecting link, said open link having one side with an opening;
 said open link forming a terminal end in said one side, said terminal end having a cross section with a width and a length;
 a first chain comprised of closed links with a first closed link having a interior aperture with a width and length, said first closed link having a reduced cross section;
 a second chain comprised of closed links with a second closed link having an interior aperture with a width and length, said second closed link having a reduced cross section;
 said cross section length being greater than said aperture widths and smaller than said aperture lengths;
 said first and second closed links with said first and second chains being removably attached to said open link by a series of translational and rotational movements; and
 wherein said first chain must be moved past said opening prior to attaching or removing said second chain.

21. A debarking chain as in claim 20 wherein said first link of said first chain is connected to said open link by the following series of translational and rotational movements performed in order:
 Translational movement along a short axis of said first link of said first chain in plane of said link toward said open link;
 Rotational movement around an intersection of said short axis and a long axis of said first link and of said first chain approximately 90°;
 Translational movement along an axis approximately perpendicular to said short axis and said long axis.

22. A debarking chain comprising:
 a quick change fitting;
 a first debarking chain comprised of one or more links, at least one of said links of said first chain being attached to said quick change fitting;
 a second chain comprised of one or more links attached to said fitting, said first chain being movable upward after attachment so that said second chain can be attached to said quick change fitting and said first chain being movable downward locking said second chain into position during operation.

23. A debarking chain as in claim 22 comprising:
 a third chain attached to said quick change fitting.

24. A method for connecting an open link to first and second closed links comprising the steps of:
 (a) aligning a reduced cross section on one side of the first closed link with an opening in one side of the open link;
 (b) moving the reduced cross section through the opening with one end formed by the opening having a dimension preventing the one end from passing through an interior aperture of the first closed link;
 (c) rotating the first closed link to align a larger dimension of the interior aperture with the dimension of the one end;
 (d) sliding the one end through the larger dimension of the interior aperture to connect the first closed link to the open link;
 (e) continuing to slide the open link through the aperture of the first closed link until the first closed link is located adjacent a second end formed by the opening;
 (f) repeating steps (a) through (d) with the second closed link; and
 (g) sliding the first closed link next to the second closed link.

25. A chain link connection comprising:
 an open link having an open interior aperture formed by a plurality of sides of said open link, one of said sides having an opening therethrough forming first and second ends and dividing said open interior aperture into first and second aperture areas adjacent said first and second ends respectively;
 first and second closed links having closed interior apertures formed by a plurality of sides, one of said sides of each said closed link having a reduced dimension sized to pass through said opening;
 said first closed link being positionable within said first aperture area when said second closed link is located at said opening; and
 said first closed link being positionable adjacent said second closed link in said second aperture area.

26. The connection of claim 25 further including a connecting link attached to said open link and disposed in said first aperture area.

27. The connection of claim 25 wherein said aperture includes channels extending from said opening to said first and second aperture areas.

28. A chain link connection comprising:

a first link having first and second arcuate sections and first and second straight sections forming a first plane therethrough and a first interior aperture therebetween, said first interior aperture having a first minor axis generally parallel to said arcuate sections and a first major axis generally parallel to said straight sections;

said first straight section having a slot therethrough forming a first end adjacent said first arcuate section and a second end adjacent said second arcuate section, said first and second ends dividing said first interior aperture into first and second mounting areas, said first mounting area being adjacent said first arcuate section and said second mounting area being adjacent said second arcuate section, said slot having a slot height determined by the minimum distance between said first and second ends, said first and second ends having generally rectangular cross-sections with first lengths extending parallel to said first plane;

second, third and fourth links each having third and fourth arcuate sections and third and fourth straight sections forming a second plane therethrough and a second closed interior aperture therebetween, said second closed interior aperture having a second minor axis generally parallel to said third and fourth arcuate sections and a second major axis generally parallel to said third and fourth straight sections, said second closed interior aperture having a second width along said second minor axis and a second length along said second major axis, said second width of said second closed interior aperture being smaller than said first lengths of said first and second ends;

said third straight section having a reduced portion, said reduced portion having a thickness which is in close tolerance with said slot height;

said second link being removably attached to said first link, said reduced portion being linearly received through said slot upon said first plane being generally perpendicular to said second plane of said second link along said second major axis, said first end preventing said second link from moving toward said first mounting area upon said first plane being generally perpendicular to said second plane, said first end passing through said second closed interior aperture upon said first length of said first end of said first link being aligned with said second length of said second aperture of said second link, said second link being housed in said first mounting area thereby connecting said first and second links;

said third link being removably attached to said first link, said reduced portion being linearly through said slot upon said first plane being generally perpendicular to said second plane of said third link along said second major axis, said second end preventing said third link from moving toward said second mounting area upon said first plane being generally perpendicular to said second plane, said first end passing through said second closed interior aperture upon said first length of said first end of said first link being aligned with said second length of said second aperture of said third link, said third link being housed within said first mounting area;

said fourth link being removably attached to said first link, said reduced portion being linearly received through said slot upon said first plane being generally perpendicular to said second plane of said fourth link along said second major axis, said second end preventing said fourth link from moving toward said second mounting area upon said first plane being generally perpendicular to said second plane, said first end passing through said second closed interior aperture upon said first length of said first end of said first link being aligned with said second length of said second aperture of said fourth link, said fourth link being housed within said second mounting area thereby connecting said first and fourth links; and said second aperture of said third link threadable along said second straight section until said third link is housed within said second mounting area adjacent said fourth link.

29. The chain link connection of claim 28 wherein said first and second ends form a slot width perpendicular to said first plane and a slot length parallel to said first plane.

30. The chain link connection of claim 29 wherein said slot length is greater than said slot width.

31. The chain link connection of claim 30 wherein said third and fourth sections having a generally circular cross-section with a diameter and said slot height equals approximately 83% of said diameter of said second link.

32. The chain link connection of claim 30 wherein said second end includes a protrusion projecting inwardly into said first interior aperture.

33. The chain link connection of claim 32 wherein said protrusion increases in cross-sectional length beginning at said slot.

34. The chain link connection of claim 33 wherein said third and fourth sections have a generally circular cross-section with a diameter and said first length of said second end, less clearance, equals said second length minus said diameter of said second link.

35. The chain link connection of claim 33 wherein said protrusion forms a stop to maintain said third and fourth links within said second mounting area.

* * * * *